United States Patent [19]

de Baan et al.

[11] 4,290,511

[45] Sep. 22, 1981

[54] LOAD-CARRYING STRUT CONSTRUCTION

[75] Inventors: Johannes J. de Baan; Adolf Adrian, both of Ennepetal, Fed. Rep. of Germany

[73] Assignee: Firma August Bilstein, Ennepetal-Altenoverde, Fed. Rep. of Germany

[21] Appl. No.: 91,636

[22] Filed: Nov. 5, 1979

[30] Foreign Application Priority Data

Nov. 11, 1978 [DE] Fed. Rep. of Germany ....... 2849100

[51] Int. Cl.³ .......................... F16F 9/36; F16F 9/54
[52] U.S. Cl. ................................ 188/322.17; 184/19; 184/25; 188/264 B; 188/322.16; 188/321.11; 280/660; 308/5 R
[58] Field of Search ..................... 188/321, 322, 264 B; 277/30, 165, 173; 280/660, 668; 308/5 R, 36.1; 184/18, 19, 25, 24

[56] References Cited

U.S. PATENT DOCUMENTS

| 787,087 | 4/1905 | Dumas | 308/5 R |
|---|---|---|---|
| 2,476,324 | 7/1949 | Reich | 188/322 X |
| 2,745,660 | 5/1956 | Delahay | 184/18 X |
| 3,147,983 | 9/1964 | Neuman et al. | 277/165 X |
| 3,396,976 | 8/1968 | Reinhoudt et al. | 277/173 X |
| 3,588,075 | 6/1971 | Peddinghaus | 280/668 X |
| 3,690,425 | 9/1972 | Willich et al. | 188/322 X |
| 3,718,209 | 2/1973 | Moslo | 308/5 R X |
| 4,005,769 | 2/1977 | Hoh | 188/322 X |

FOREIGN PATENT DOCUMENTS 833874  5/1960  United Kingdom ................ 188/322

Primary Examiner—George E. A. Halvosa
Attorney, Agent, or Firm—Neuman, Williams, Anderson & Olson

[57] ABSTRACT

A load-carrying, shock absorbing strut is provided comprising an outer tube for carrying a wheel axle journal. There is slidably accommodated in the tube a shock absorber cylinder which is connected with the chassis frame. A downwardly emerging piston rod of the cylinder is fastened to the bottom of the outer tube. Between the shock absorber cylinder and the outer tube there is provided a lubricant annular chamber of constant volume which is closed off above and below by upper and lower guide and sealing rings arranged on the outer tube. A sealing ring is arranged above each guide ring with axially limited play and comprise lubricant-sealing felt rings. To effect good dirt-deflecting action there is present above the upper sealing ring a dirt-deflecting ring which has the dual function of limiting the sealing ring axial play as well as removing dirt from the shock absorber cylinder.

6 Claims, 6 Drawing Figures

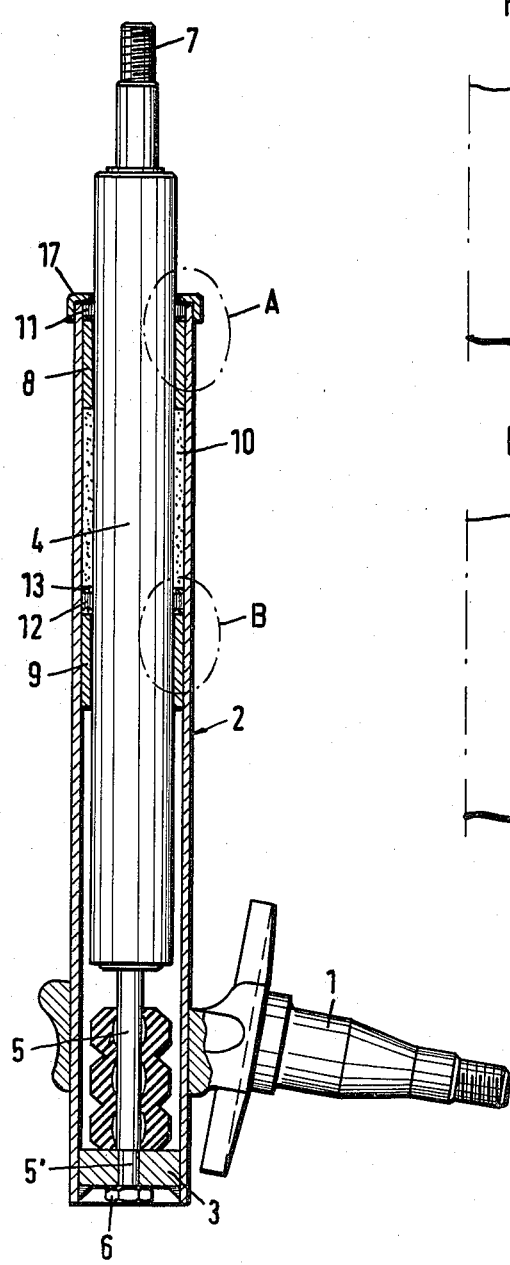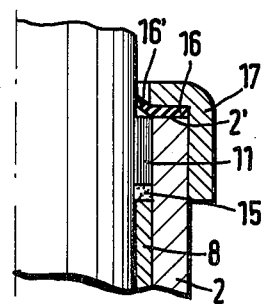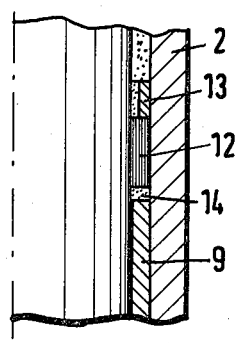

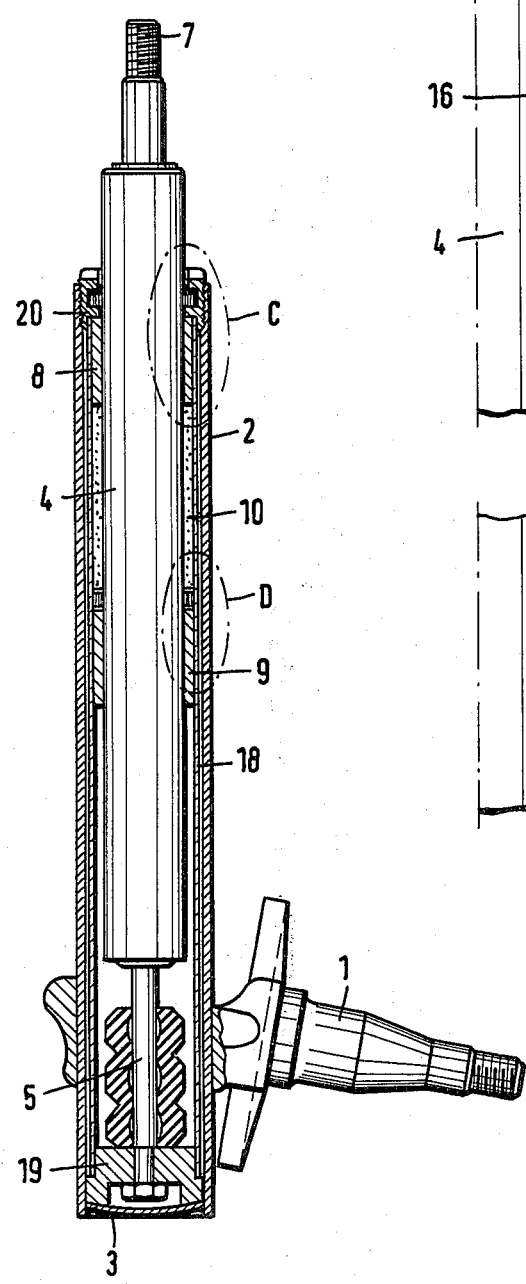
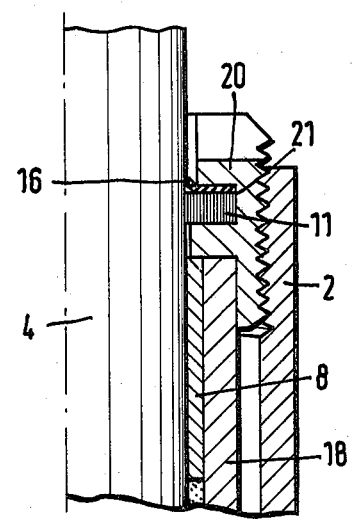
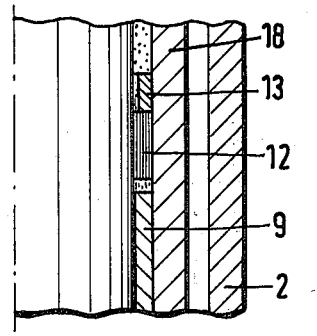

LOAD-CARRYING STRUT CONSTRUCTION

The invention relates to a load-carrying shock absorbing strut for motor vehicles, especially a front axle strut. The strut includes an outer tube carrying a wheel axle journal. A shock absorber cylinder is reciprocally, slidably accommodated in the tube. The cylinder is connected at its end projecting from the top of the outer tube with the chassis frame. A downwardly emerging piston rod extending from the cylinder is fixedly secured to the base of the outer tube. Between the shock absorber cylinder and the outer tube there is provided a lubricant annular chamber of constant volume closed off by upper and lower guide and sealing rings secured to the outer tube.

Known vehicle shock absorbing struts of the above type, e.g., as disclosed in German Pat. No. 16 25 418, are advantageously distinguished from others in that in them the lubricant accommodated in the annular chamber of constant volume cannot be expelled as a result of relative movement between the damper cylinder and the outer tube through corresponding pumping action, so that the wear-reducing lubricating action between the shock absorber cylinder and the guide rings is constantly maintained.

There is no lubricant loss as the sealing rings provide for the necessary sealing of the lubricant annular chamber.

In the known shock absorbing struts of the prior art, this ring chamber is filled with a liquid lubricant, whereby the guide surfaces are well wetted, to be sure, but the sealing remains problematic and corresponding lubricant fluid losses are not to be avoided with continued use. Further, in the known shock absorbing struts of the type indicated, there is present the disadvantage that the upper guide and sealing rings are inadequately protected against contamination, such as by dust, sand, water or street salt, which settle on the shock absorber cylinder portion projecting from the top of the outer tube. The contaminants are subsequently carried by the top cylinder portion into the region of the upper sealing and guide ring, where the contaminants result in abrasion and scoring.

Underlying the invention, therefore, is the problem of providing a load-carrying shock absorbing strut for motor vehicles, in particular a front axle strut. The strut of this invention provides better lubrication between the shock absorber cylinder and the guide rings with simultaneous good dirt-deflecting action and substantially better sealing of the lubricant annular chamber. This problem is solved in shock absorbing struts of the type above indicated in accordance with this invention by arranging the sealing rings in each case above the guide rings with limited axial movement and constructing the same in the form of felt seal rings. Above the upper felt ring there is present a dirt deflecting ring which limits the axial movement of such ring and consists of abrasion-proof plastic. By means of the felt rings arranged in each case with axially limited play above the guide rings, the lubricant annular chamber filled with a suitable lubricating grease is efficiently sealed, and, in addition, it is simultaneously assured that in the small annular chambers formed between them and the guide rings there can be maintained a constant supply of lubricating grease, which makes it possible to better lubricate the guide rings.

Simultaneously, because of the plastic dirt-deflecting ring arranged above the upper felt ring it is insured that all contaminants settling on the upper part of the shock absorber cylinder which projects from the top of the outer tube are stripped from and prevented from engaging the upper sealing and guide ring or entering into the lubricating grease annular chamber.

It has proved especially advantageous if the dirt-deflecting ring comprises a flat annular disk which, in the uninstalled state, possesses an inside diameter which is smaller than the outside diameter of the shock absorber cylinder to such a degree that the inner circumference of the annular disk when installed is deformed to a sealing lip bent upward through an angle of about 45°. Since the dirt-deflecting ring effects substantially a line contact with the shock absorber cylinder, a good contaminant-stripping action results upon cylinder movement with only relatively low sliding friction. Also, breakaway forces occurring upon reverse movement of the shock absorber cylinder relative to the dirt-deflecting ring are kept as low as possible. Such rings, moreover, are producible simply and economically. Also, the dirt-deflecting ring ensures a long life and functional security of the strut, especially if the ring is formed of glass-fiber-reinforced polytetrafluoroethylene (PTFE).

For the limitation of the axial play of the lower felt ring arranged above the lower guide ring there is placed a correspondingly fastened stop ring.

The guide and felt rings, as well as the dirt-deflecting ring and the stop ring, can be arranged directly on the inside wall of the outer tube, in which case the dirt-deflecting ring lies expediently on the upper face edge of the outer tube and is held by a cover ring pressed or screwed onto the end of the outer tube. Thus, there is achieved a very simple assembling of the upper felt ring and of the dirt-deflector ring situated over it.

It is also possible to arrange the two guide rings as well as the lower felt ring and its stop ring in a cartridge sleeve slidably insertable into the outer tube which surrounds the shock absorber cylinder and its piston rod. The cartridge is joined with the piston rod on its bottom and is joined at the top to a threaded nut for engagement with threads formed on the outer tube. In such construction the upper felt ring as well as the dirt-deflecting ring are mounted on the threaded-nut inner wall. In such construction, therefore, the shock absorber cylinder, its piston rod and the cartridge sleeve, as well as its threaded nut containing the dirt-deflecting ring and the upper felt ring, form an easily changeable shock absorber-cartridge component. Such cartridge can conveniently be installed as such in the outer tube and threadedly engage with it, and can easily be correspondingly disassembled therefrom.

In the drawing there are represented two examples of motor vehicle front axle struts made according to the invention in which:

FIG. 1 shows in vertical longitudinal section a shock absorbing strut with the shock absorber installed directly in the outer tube;

FIGS. 2 and 3 comprise enlarged fragmentary view of the encircled areas A and B, respectively, of FIG. 1;

FIG. 4 shows in vertical longitudinal section a shock absorbing strut with a changeable damper cartridge component; and FIGS. 5 and 6 comprise enlarged fragmentary views of the encircled areas C and D, respectively, of FIG. 4.

The motor vehicle front axle strut represented in FIG. 1 has an outer tube 2 carrying wheel axle journal 1, which outer tube is closed at its lower end by bottom 3, which may be welded in place. Tube 2 is normally provided with a spring plate (not illustrated) normally supported by means of a spiral pressure spring (not illustrated) partially carrying the vehicle load resiliently with respect to the chassis frame of such motor vehicle.

In the outer tube 2, the shock absorber cylinder 4 of a hydropneumatic one-tube vibration damper filled preferably with compressed gas and damping fluid is accommodated. Piston rod 5 carrying the working piston (not illustrated) extends through a sealed opening from the bottom of the shock absorber cylinder 4 as illustrated in FIG. 1. At its lower end 5' the piston rod is fastened in the outer tube bottom 3 by means of nut 6 screwed on the piston rod end 5' which is provided with suitable male threads. On its upper end projecting from the outer tube 2 the shock absorber, cylinder 4 carries the threaded fastening pin 7 whereby the shock absorber cylinder is to be connected in a known manner with the chassis frame of the motor vehicle on which disposed.

On the inner wall of the outer tube 2 there are fastened in suitably spaced relationship two guide rings 8 and 9, which serve to guide the damper cylinder 4 in the outer tube and enclose the lubricant annular chamber 10 situated between them. Chamber 10 is filled with a suitable lubricating grease. In each case, above the two guide rings 8, 9 there are arranged with limited axial movement sealing rings 11, 12, which are constructed as lubricating-grease-sealing felt rings. Above the lower felt ring 12 there is arranged a stop ring 13, which may be clamped or pressure seated on the inner wall of the outer tube 2. This stop ring 13, together with the lower guide ring 9, define the limits of the axial play of the felt ring 12, which in this manner, as is shown in particular in FIG. 3, encloses between it and the guide ring 9 a small annular chamber 14, in which a suitable supply of grease can accumulate for improving the lubrication of the lower guide ring 9.

Above the upper felt ring 11, which encloses with the upper guide ring 8 a corresponding small grease chamber 15, there is arranged the dirt-deflecting ring 16, which preferably consists of glass fiber-reinforced polytetrafluoroethylene (PTFE). In the uninstalled state this dirt-deflecting ring 16 is present in the form of a flat annular disc, the inside diameter of which is somewhat smaller than the outside diameter of the shock absorber cylinder 4. For installing the same, annular disc 16 is slipped over the shock absorber cylinder 4 until it lies flat on the upper face edge 2' of the outer tube 2 and is held by the cover ring 17 to be pressed or screwed in place. In the aforementioned slipping-on of the annular disc 16 over the shock absorber cylinder 4, the inner circumference of the disc 16 is deformed into a sealing lip 16' bent upwardly through an angle of about 45°. Lip 16' defines a narrow stripping edge, effecting a linear engagement with the circumference of the shock absorber cylinder 4 and thereby developing a highly efficient stripping action, in which there occurs only slight sliding friction. Also, the breakaway forces realized at the moment of reversal of relative movement between the shock absorber cylinder 4 and the dirt-deflecting ring 16 are extremely slight. The dirt-deflecting ring 16, therefore, permanently insures that contaminants, such as dust, water, salt granules and the like, deposited on the upper part of the shock absorber cylinder, are unable to pass into the zone of the felt ring 11 or of the guide ring 8 located under it. The protection afforded by ring 16 obviates wear and corrosion as well as washing out of the grease chamber 15. Also, the danger of lubricating grease encrustations in these places is similarly prevented.

In the damper cartridge component represented in FIGS. 4 to 6, the two guide rings 8, 9 as well as the lower felt ring 12 and its stop ring 13 are arranged in a cartridge sleeve 18. The sleeve 18 is slidable into the outer tube 2, which in a known manner surrounds the shock absorber cylinder 4 and its piston rod 5. Sleeve 18 is firmly joined with the rod 5 at its bottom end by means of bottom piece 19, and at its upper end engages threaded nut 20, threadably engaged to the outer tube 2.

In this embodiment the felt ring 11 arranged above the upper guide ring 8, as well as the dirt-deflecting ring 16, are desirably accommodated in a corresponding recess 21 of the screw nut 20. In the embodiment of FIGS. 4–6, therefore, the shock absorber cylinder 4, the piston rod 5, the cartridge sleeve 18 and the threaded nut 20 form with the installed guide and felt rings as well as the dirt-deflecting ring 16 a self-contained replaceable component. The latter component may be slid into the outer tube 2 far enough so that in the process the cartridge bottom 19 comes into engagement on the bottom 3 of the outer tube. The threaded nut 20 is then screwed into place in the outer tube 2. The advantages mentioned above for the lubricant and dirt-deflecting seal described in conjunction with the embodiment of FIGS. 1 to 3 are also fully insured with the damper cartridge embodiment illustrated in FIGS. 4–6.

It is believed apparent from the foregoing that a number of modifications may be made in the apparatus illustrated which remain within the ambit of the invention disclosed. This invention, therefore, is to be limited only by the scope of the appended claims.

What is claimed is:

1. A shock absorbing strut for a vehicle comprising an outer tube for carrying a vehicle wheel axle journal; a shock absorber cylinder slidably axially movable in said outer tube; said cylinder being connected at an end projecting from the outer tube with the vehicle chassis frame and having an exteriorly extending piston rod fastened to the outer tube bottom; a lubricant annular chamber of constant volume closed off by upper and lower fixedly positioned guide rings and sealing rings disposed adjacent said guide rings; said guide and sealing rings being disposed between the shock absorber cylinder and the outer tube; each of said sealing rings being arranged above its respective guide ring in the normal position of strut use with axially limited play and comprising a lubricant sealing felt ring; and a dirt-deflecting ring composed of water-resistant plastic disposed above the upper lubricant-sealing ring for limiting the axial play of said upper lubricant-sealing ring.

2. The shock absorbing strut of claim 1 in which said dirt-deflecting ring comprises an annular disc that is flat in the uninstalled state, the inside diameter of which is so much smaller than the outside diameter of the shock absorber cylinder that the inner circumference of the annular disc is deformed upon installation to a sealing lip bent upward through about 45°.

3. The shock absorbing strut of claims 1 or 2 in which the dirt-deflecting ring is formed of glass-fiber-reinforced polytetraflurorethylene (PTFE).

4. The shock absorbing strut of claims 1 or 2 in combination with a stop ring disposed between said shock absorber cylinder and said outer tube for limiting the axial play of said lower felt ring.

5. The shock absorbing strut of claim 4 in which the guide and felt rings as well as the dirt-deflecting ring and the stop ring are arranged directly on the inside wall of the outer tube, and the dirt-deflecting ring lies on the upper face edge of the outer tube and is held in place by a cover ring secured to the outer end of the tube.

6. The shock absorbing strut of claim 4 in which the two guide rings as well as the lower felt ring and its stop ring are accommodated in a cartridge sleeve slidable into the outer tube which surrounds the shock absorber cylinder and its piston rod is connected with the cartridge at its lower end, and is secured at the top by means of a threaded nut to the outer tube; the upper felt ring as well as the dirt-deflecting ring being mounted on the inner wall of the threaded nut.

* * * * *